(12) United States Patent
Nozaki

(10) Patent No.: US 12,470,788 B2
(45) Date of Patent: Nov. 11, 2025

(54) IMAGE PICKUP APPARATUS

(71) Applicant: CANON KABUSHIKI KAISHA, Tokyo (JP)

(72) Inventor: Kosuke Nozaki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 123 days.

(21) Appl. No.: 17/982,780

(22) Filed: Nov. 8, 2022

(65) Prior Publication Data

US 2023/0152576 A1 May 18, 2023

(30) Foreign Application Priority Data

Nov. 18, 2021 (JP) .................................. 2021-187607

(51) Int. Cl.
*H04N 23/51* (2023.01)
*G02B 7/02* (2021.01)
*G02B 27/00* (2006.01)

(52) U.S. Cl.
CPC ............. *H04N 23/51* (2023.01); *G02B 7/021* (2013.01); *G02B 7/026* (2013.01); *G02B 27/0006* (2013.01)

(58) Field of Classification Search
None
See application file for complete search history.

(56) References Cited

U.S. PATENT DOCUMENTS

| | | | | |
|---|---|---|---|---|
| 2011/0242321 A1* | 10/2011 | Nakajima | ............... | G02B 7/021 348/148 |
| 2012/0019940 A1* | 1/2012 | Lu | ..................... | H01L 27/14618 359/819 |
| 2015/0205186 A1* | 7/2015 | Park | ........................ | G02B 7/026 348/373 |
| 2016/0018619 A1* | 1/2016 | Gustafson | .............. | G02B 7/026 29/525.08 |
| 2017/0223245 A1* | 8/2017 | Park | ........................ | G02B 7/04 |

(Continued)

FOREIGN PATENT DOCUMENTS

| | | |
|---|---|---|
| JP | 6054720 B2 | 12/2016 |
| JP | 2018-146772 A | 9/2018 |
| KR | 20190051604 A | 5/2019 |

OTHER PUBLICATIONS

The above patent documents were cited in the Jun. 24, 2025 Japanese Office Action, which is enclosed without an English Translation, that issued in Japanese Patent Application No. 2021-187607.

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

An image pickup apparatus includes a sensor unit, a lens unit that includes a lens and a lens frame configured to hold the lens, a housing configured to hold the sensor unit and the lens unit, a cover portion configured to cover part of the lens, a first elastic body disposed between a groove portion provided in an outer diameter portion of the lens unit and an inner diameter portion of the housing, and a second elastic body disposed between the cover portion and the lens. In an optical axis direction, a first biasing force applied to the lens unit by the first elastic body acts in the same direction as a second biasing force applied to the lens unit by the second elastic body.

12 Claims, 3 Drawing Sheets

(56) References Cited

U.S. PATENT DOCUMENTS

| | | | |
|---|---|---|---|
| 2018/0246395 A1* | 8/2018 | Kholopov | G03B 43/00 |
| 2019/0001932 A1* | 1/2019 | Ito | G03B 17/08 |
| 2019/0235217 A1* | 8/2019 | Hasegawa | H04N 23/00 |
| 2020/0363702 A1* | 11/2020 | Nakamura | G03B 17/08 |
| 2021/0294066 A1* | 9/2021 | Hirata | H05B 1/0288 |
| 2023/0213839 A1* | 7/2023 | Watanabe | G03B 17/08 396/25 |

\* cited by examiner

IMAGE PICKUP APPARATUS

BACKGROUND

Technical Field

The disclosure relates to image pickup apparatuses such as in-vehicle cameras and surveillance cameras.

Description of the Related Art

Image pickup apparatuses to be used in outdoor environments, such as in-vehicle cameras and surveillance cameras, are required to have improved environmental performance such as waterproof performance. Japanese Patent No. 6054720 discloses an optical unit that secures waterproof performance by holding a sealing member between a lens having a first sealing area and a fixing portion having a second sealing area and fixing the lens in a lens barrel from a surface facing the object.

It is necessary for an image pickup apparatus having no focusing mechanism (fixed focus lens) to adjust a focus position of an optical system and an imaging plane with high accuracy in an assembly of the image pickup apparatus because the focus position of the optical system and the position of the imaging plane are not movable during use. Japanese Patent Laid-Open No. 2018-146772 discloses an image pickup apparatus in which a lens barrel is held by a barrel holding member movably in an optical axis direction relative to an image sensor, and the barrel holding member and the lens barrel are adhered to each other.

However, in the image pickup apparatus disclosed in Japanese Patent Laid-Open No. 2018-146772 in which the barrel holding member and the lens barrel are adhered together, a holding force between the barrel holding member and the lens barrel may be lowered due to softening of the adhesion portion under high temperature and high humidity. At this time, in an attempt to secure waterproof performance using the structure that always generates a force for pressing the lens toward the sensor side, as disclosed in Japanese Patent No. 6054720, the biasing force of the sealing member presses the lens barrel toward the sensor side and may cause the focus position to shift.

SUMMARY

The disclosure provides an image pickup apparatus that can restrain a focus position from shifting while securing waterproof performance.

An image pickup apparatus according to one aspect of this disclosure includes a sensor unit, a lens unit that includes a lens and a lens frame configured to hold the lens, a housing configured to hold the sensor unit and the lens unit, a cover portion configured to cover part of the lens, a first elastic body disposed between a groove portion provided in an outer diameter portion of the lens unit and an inner diameter portion of the housing, and a second elastic body disposed between the cover portion and the lens. In an optical axis direction, a first biasing force applied to the lens unit by the first elastic body acts in the same direction as a second biasing force applied to the lens unit by the second elastic body.

Further features of the disclosure will become apparent from the following description of exemplary embodiments with reference to the attached drawings.

DESCRIPTION OF THE EMBODIMENTS

Referring now to the accompanying drawings, a detailed description will be given of an embodiment according to the disclosure. This embodiment is suitable for image pickup apparatuses, such as in-vehicle cameras and surveillance cameras, which are used in outdoor environments. In this embodiment, a housing structure, an electrical structure, etc. attached to a lens barrel are well-known technologies, and thus a detailed description thereof will be omitted in this embodiment.

Figure 3:
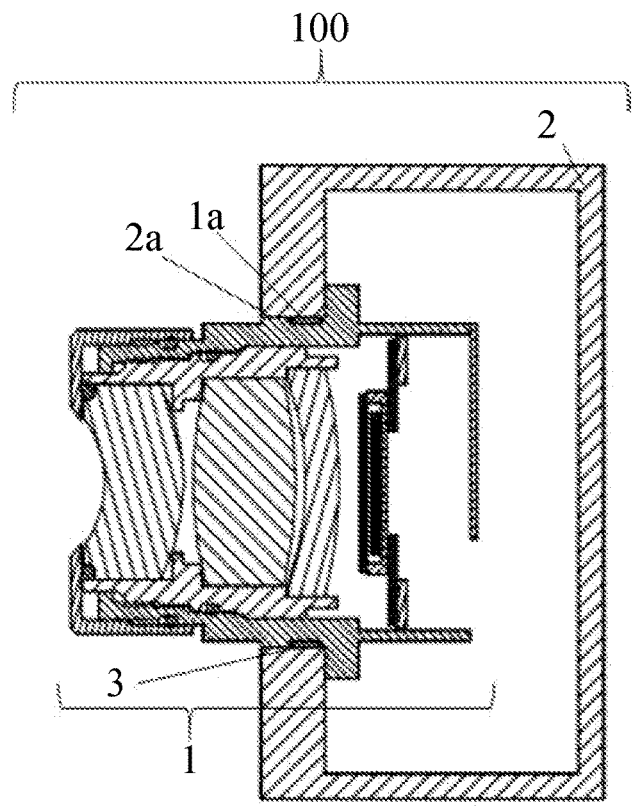
FIG. 3 is a sectional view of an image pickup apparatus according to this embodiment.

Referring now to FIG. 3, a description will be given of a camera (image pickup apparatus) 100 according to this embodiment. FIG. 3 is a sectional view of the camera 100. A lens module 1 is partially exposed from an opening portion 2a provided in front (on the object side) of an exterior 2, and is fixed to and held by the exterior 2 with unillustrated screws. An elastic body 3 is provided between the opening portion 2a in the exterior 2 and an outer circumferential portion (outer diameter portion) 1a of the lens module 1. By sandwiching the elastic body 3 between the outer diameter portion 1a and the opening portion 2a, a space between the lens module 1 and the exterior 2 is sealed and water can be prevented from entering the interior of the exterior 2 from the outside of the camera 100.

Figure 1:
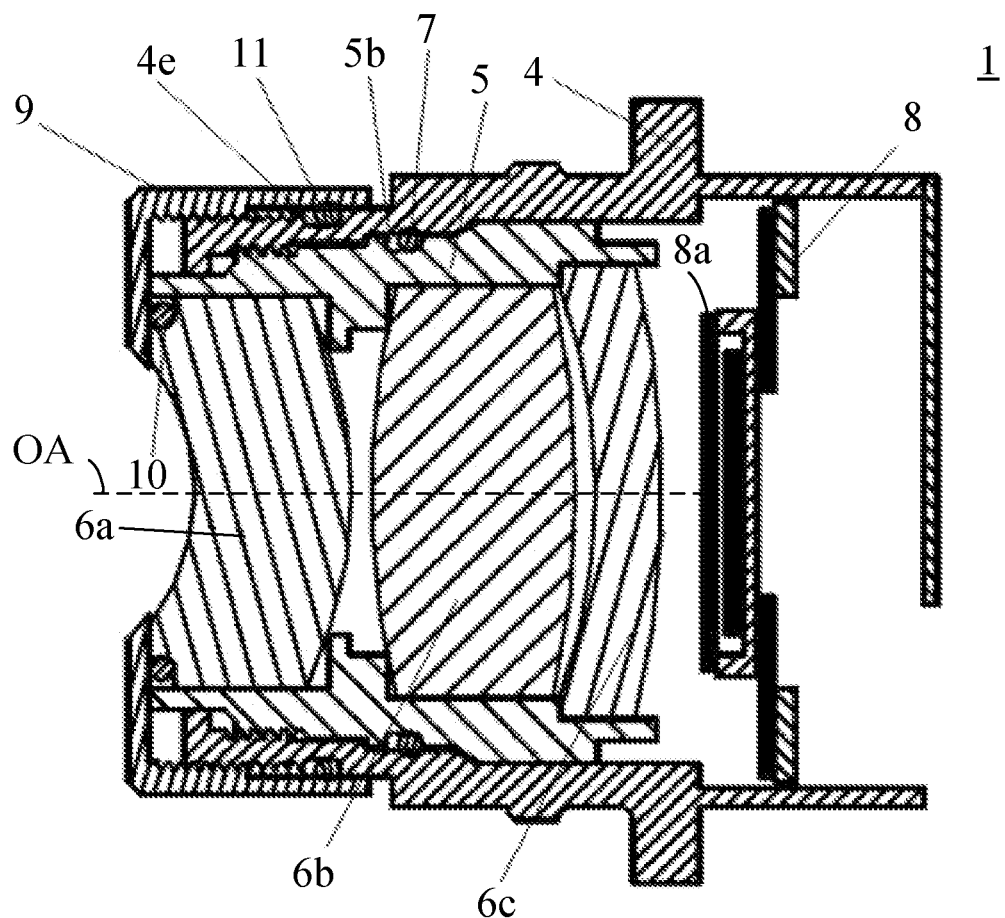
FIG. 1 is a sectional view of a lens module according to this embodiment.
Figure 2A:
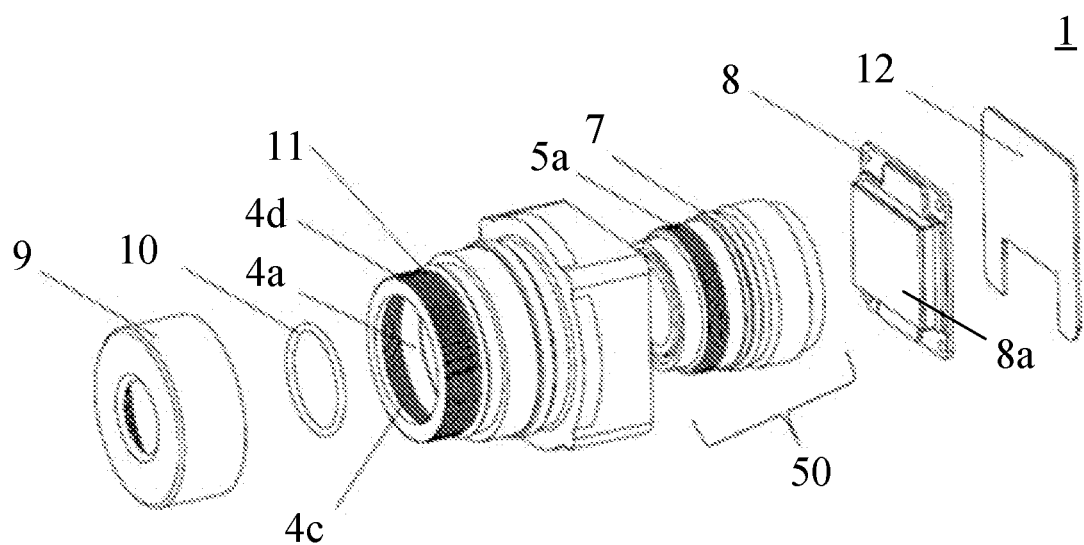
FIGS. 2A and 2B are exploded perspective views of the lens module according to this embodiment.
Figure 2B:
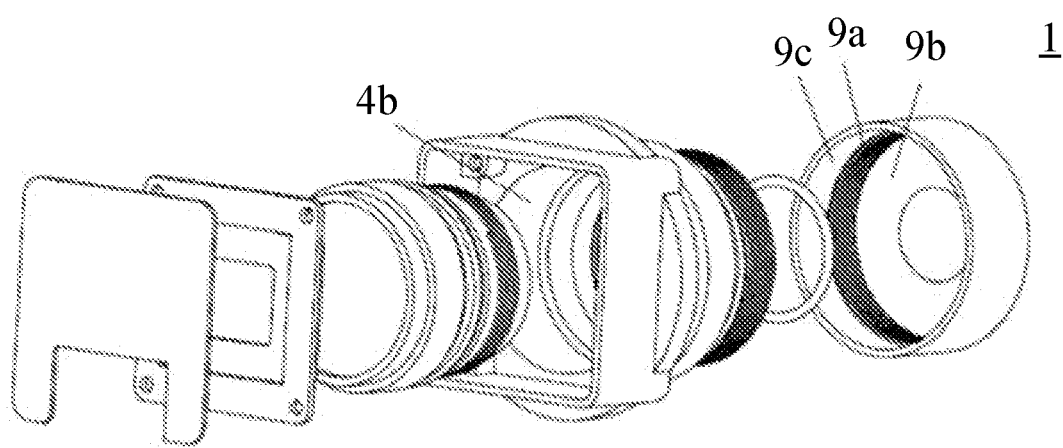

Referring now to FIGS. 1, 2A, and 2B, a detailed description will be given of the lens module 1 according to this embodiment. FIG. 1 is a sectional view of the lens module 1. FIG. 2A is an exploded perspective view of the lens module 1 viewed from the object side, and FIG. 2B is an exploded perspective view of the lens module 1 viewed from an image sensor side (image side).

A holding frame (housing) 4 of the lens module 1 has a circular opening portion 4a, a rectangular opening portion 4b, an inner diameter threaded portion 4c, an outer diameter threaded portion 4d, and a groove 4e. The lens unit 50 includes a lens frame 5 and lenses 6a, 6b, and 6c, and is inserted into the circular opening portion 4a. The outer diameter portion of the lens frame 5 includes an outer diameter threaded portion 5a, and a groove (groove portion) 5b. The groove 5b is tilted so that a diameter becomes smaller as a position approaches a cover portion. A first elastic body 7 is, for example, an O-ring having an annular shape and is housed in the groove 5b. The lens frame 5 is held by the holding frame 4 as a result of that the outer diameter threaded portion 5a and the inner diameter threaded portion 4c of the holding frame 4 are screwed with each other while the first elastic body 7 is attached to the lens frame 5.

A sensor unit 8 includes a sensor (image sensor) 8a such as a CMOS sensor. The sensor unit 8 is inserted into the rectangular opening portion 4b in the holding frame 4, attached to an unillustrated receiving portion provided inside the rectangular opening portion 4b, and fixed with unillustrated screws. A cover 12 is fixed to the holding frame 4 with unillustrated screws so as to cover the back surface of the sensor unit 8. Due to this structure, the lens unit 50 and the sensor unit 8 are held by the holding frame 4. Since the lens unit 50 is held in the holding frame 4 by screwing (screw engagement), the position of the sensor unit 8 can be adjustable along the optical axis OA (optical axis direction).

Next follows a description of focusing as an optical adjustment. A focus position of the lens unit 50 and a position of an imaging plane of the sensor unit 8 are different for each component due to manufacturing variations in a component and assembly. In a case where the manufacturing variation is large relative to a depth of focus, a relationship between the focus position of the lens unit 50 and the position of the imaging plane of the sensor unit 8 may not coincide with each other within a range of the depth of focus even if the assembly is made without care. In such a case, it is necessary to adjust the relationship between the focus position of the lens unit 50 and the position of the imaging plane of the sensor unit 8 during assembly so that they coincide with each other within the range of the depth of focus. Therefore, an optical position adjustment (focusing) is made while the focus performance is confirmed by using a captured image or an evaluation value in the image. More specifically, in the optical position adjustment, an evaluation chart is set in front (on the object side) of the lens unit 50, and the resolution and contrast value are checked from a captured chart image, the lens unit 50 is moved relative to the imaging plane in the optical axis direction to a position that satisfies the required image quality.

A description will now be given of a pressing ring 9. The pressing ring 9 is a cover portion that partially covers the lens (front lens) 6a of the lens unit 50, and has an inner diameter threaded portion 9a, a contact surface 9b, and an inner circumferential portion (inner diameter portion) 9c. The lens 6a is the frontmost lens among the plurality of lenses 6a, 6b, and 6c in the lens unit 50 and is disposed closest to the object. A third elastic body 11 having an annular shape is housed in the groove 4e in the holding frame 4. A second elastic body 10 is disposed (sandwiched) between the contact surface 9b of the pressing ring 9 and the lens 6a. The second elastic body 10 is, for example, an O-ring having an annular shape. While the third elastic body 11 is sandwiched between the inner diameter portion 9c and the groove 4E in the holding frame 4, the inner diameter threaded portion 9a of the pressing ring 9 and the outer diameter threaded portion 4d of the holding frame 4 are screwed with each other, and thereby the pressing ring 9 is held by the holding frame 4. When the second elastic body 10 and the third elastic body 11 are sandwiched due to this structure, hermetical sealing is made and water can be prevented from entering the lens unit 50 and the sensor unit 8 housed inside the holding frame 4. In this embodiment, the pressing ring 9 is a separate member from the holding frame 4, but the holding frame 4 and the pressing ring 9 may be integrated with each other.

Figure 4:
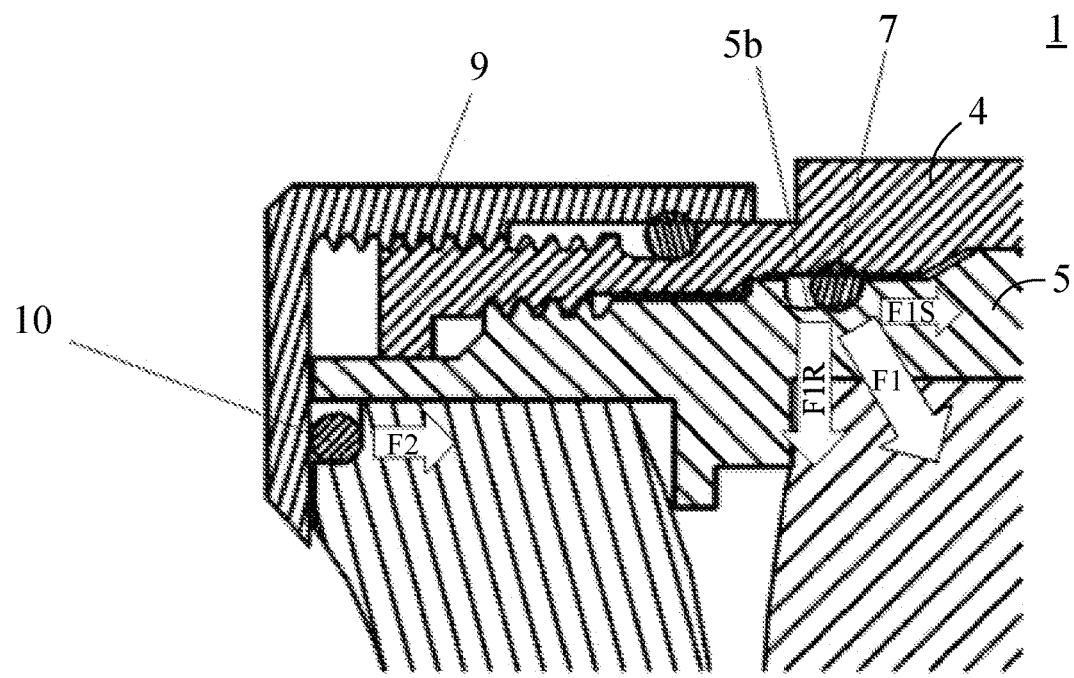
FIG. 4 is an enlarged sectional view of the lens module according to this embodiment.

Referring now to FIG. 4, a description will be given of a relationship of biasing forces in this structure. FIG. 4 is an enlarged sectional view of the lens module 1. A biasing force F1 is generated by disposing (sandwiching) the first elastic body 7 between the groove 5b in the lens frame 5 and the inner diameter portion of the holding frame 4. The groove 5b has a tilted surface that is tilted so that a diameter decreases as a position approaches the cover portion 9 (the bottom surface of the groove 5b is tilted so that the distance from the optical axis OA becomes smaller as the position approaches the cover portion (the object)). Thus, the biasing force F1 is generated in a direction orthogonal to the tilted groove 5b. The biasing force F1 can be divided into a component force (first biasing force) F1S in the optical axis direction and a component force (third biasing force) F1R in a direction orthogonal to the optical axis. Due to the component force F1S, the biasing force acts to press the lens unit 50 against the holding frame 4 in a direction toward the sensor unit 8. A frictional force is generated by the component force F1R and acts as resistance in the circumferential direction, thereby displacement in the optical axis direction can be suppressed even under disturbances such as vibration and impact.

In this embodiment, the radial size (diameter of the ring) of the second elastic body 10 having the annular shape is smaller than the radial size of the first elastic body 7 having the annular shape. Thereby, in a case where the biasing forces applied to the lens unit 50 are equal to each other, the resistance in the circumferential direction generated by the first elastic body 7 during assembly of the pressing ring 9 is larger than the resistance in the circumferential direction generated by the second elastic body 10. Thus, during assembly of the pressing ring 9, the lens unit 50 is restrained from moving in the circumferential direction and is less likely to shift in the optical axis direction. In addition to the frictional force by the biasing force F1R in the direction orthogonal to the optical axis generated by the first elastic body 7, the holding frame 4 and the lens unit 50 may be adhered to each other before the pressing ring 9 is assembled. For example, the fixation can be enhanced by adhesion around the inner diameter threaded portion 4c of the holding frame 4 and the outer diameter threaded portion 5a of the lens unit 50 after focusing.

The second elastic body 10 is sandwiched between the lens 6a and the contact surface 9b of the pressing ring 9, thereby generating a biasing force (second biasing force) F2. The biasing force F2 generates a biasing force that presses the lens unit 50 toward the sensor unit 8 relative to the holding frame 4.

Due to the above structure, the component force F1S and the component force F1R are generated in a case where the holding frame 4 and the lens unit 50 are held together by screw engagement and the first elastic body 7 held in the tilted groove 5b so that the diameter becomes smaller as the position approaches the cover portion (the object) is sandwiched between the holding frame 4 and the groove 5b. Since a single elastic body can generate a biasing force in the optical axis direction and a biasing force in the direction orthogonal to the optical axis without preparing a biasing member for each direction, this structure contributes to the miniaturization of the lens module 1.

The component force F1R in the direction orthogonal to the optical axis generated by the first elastic body 7 generates resistance in the circumferential direction. This structure can prevent the holding force from being lowered by temperature changes in an external environment, etc., more effectively than the holding structure using only adhesion, and can suppress displacement of the lens unit 50 in the optical axis direction.

In addition to the biasing force F1R, the lens unit 50 and the holding frame 4 may be adhered to each other before the pressing ring 9 is attached after focusing. Thereby, the holding force can be further enhanced.

Focusing is available while backlash (screw play) in the optical axis direction between the outer diameter threaded portion 5a of the lens frame 5 and the inner diameter threaded portion 4c of the holding frame 4 is always biased toward the sensor unit 8 by the component force F1S in the optical axis direction generated by the first elastic body 7. Thereafter, waterproof performance is secured by assembling the second elastic body 10 between the pressing ring 9 and the frontmost lens 6a of the lens unit 50. At this time, even if the lens unit 50 is pressed toward the sensor unit 8 relative to the holding frame 4 by the biasing force F2 generated by the second elastic body 10, both the biasing force F1S and the biasing force F2 act in a single direction as the optical axis direction (same direction). That is, in the optical axis direction, the first biasing force (biasing force F1S) applied to the lens unit 50 by the first elastic body 7 acts in the same direction as the second biasing force (biasing force F2) applied to the lens unit 50 by the second elastic body 10. Therefore, the lens unit 50 will not be out of focus due to the biasing force F2. This structure can restrain the focus position of the lens unit 50 from shifting under various environments while waterproof performance is secured.

the first elastic body 7 may have a diameter larger than that of the second elastic body 10. Thereby, the torque generated by the biasing force F1S of the first elastic body 7 becomes stronger than the torque generated by the second elastic body 10. Therefore, when the pressing ring 9 and the second elastic body 10 are assembled, the lens unit 50 is less likely to displace during assembly.

This embodiment suppresses displacement in the optical axis direction under high temperature and humidity by holding the housing and the lens unit by screw (or thread) engagement. In addition, this embodiment can suppress displacement caused by the biasing force of the elasticity body for securing waterproof performance by setting, to the same direction, the components in the optical axis direction of the biasing force generated by the elastic body for eliminating the backlash (screw play) and the biasing force generated by the elastic body for securing the waterproof performance. Therefore, this embodiment can provide an image pickup apparatus that can restrain the focus position from shifting while securing the waterproof performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. For example, this embodiment uses screwing as an example of a mechanical engagement, but can use another mechanical engagement, such as fitting (or mating).

This application claims the benefit of Japanese Patent Application No. 2021-187607, filed on Nov. 18, 2021, which is hereby incorporated by reference herein in its entirety.

What is claimed is:

1. An image pickup apparatus comprising:
   a sensor unit;
   a lens unit that includes a plurality of lenses and a lens frame configured to hold the plurality of lenses;
   a housing configured to hold the sensor unit and the lens unit;
   a cover portion configured to cover part of a lens disposed closest to an object among the plurality of lenses;
   a first elastic body disposed between a groove portion provided in an outer diameter portion of the lens unit and an inner diameter portion of the housing;
   a second elastic body disposed between the cover portion and the lens; and
   a third elastic body disposed between the housing and the cover portion,
   wherein the second elastic body is disposed at a position closer to an optical axis than the first elastic body and closer to the object than the first elastic body,
   wherein the third elastic body is disposed at a position farther from the optical axis than the first elastic body and closer to the object than the first elastic body and closer to an imaging plane than the second elastic body,
   wherein the lens frame is held by the housing by screwing a first threaded portion of the lens frame with a second threaded portion of the housing while the first elastic body is attached to the lens frame,
   wherein the cover portion is held by the housing such that the second elastic body is sandwiched between the cover portion and the lens by screwing a third threaded portion with a fourth threaded portion of the housing,
   wherein in an optical axis direction, a first biasing force applied to the lens unit by the first elastic body is in the same direction as a second biasing force applied to the lens unit by the second elastic body,
   wherein the same direction is a direction from an object toward the sensor unit,
   wherein a bottom surface of the groove portion is tilted so that a distance from the optical axis decreases as a position approaches the cover portion,
   wherein the first elastic body is provided on the bottom surface of the groove portion to bias the lens unit with the first biasing force toward the sensor unit in the optical axis direction and to bias the lens unit with a third biasing force toward the optical axis in a direction orthogonal to the optical axis, and
   wherein backlash in the optical axis direction between the first threaded portion of the lens frame and the second threaded portion of the housing is biased toward the sensor unit by the first biasing force in the optical axis direction generated by the first elastic body.

2. The image pickup apparatus according to claim 1, wherein each of the first elastic body and the second elastic body has an annular shape, and
   wherein the second elastic body has a diameter smaller than that of the first elastic body.

3. The image pickup apparatus according to claim 1, wherein the cover portion is a separate member from the housing.

4. The image pickup apparatus according to claim 3,
   wherein the cover portion is held by the housing as a result of the third threaded portion of the cover portion and the fourth threaded portion of the housing being engaged with each other.

5. The image pickup apparatus according to claim 1, wherein the housing and the lens unit are adhered together.

6. The image pickup apparatus according to claim 1, wherein the housing has an opening portion, and
   wherein the lens unit is inserted into the opening portion in the housing and held by and engaged with the housing.

7. A lens module comprising:
   a lens unit that includes a plurality of lenses and a lens frame configured to hold the plurality of lenses;
   a housing configured to hold the lens unit;
   a cover portion configured to cover part of a lens disposed closest to an object among the plurality of lenses;
   a first elastic body disposed between a groove portion provided in an outer diameter portion of the lens unit and an inner diameter portion of the housing;
   a second elastic body disposed between the cover portion and the lens; and
   a third elastic body disposed between the housing and the cover portion,
   wherein the second elastic body is disposed at a position closer to an optical axis than the first elastic body and closer to the object than the first elastic body, wherein the third elastic body is disposed at a position farther from the optical axis than the first elastic body and closer to the object than the first elastic body and closer to an imaging plane than the second elastic body, wherein the lens frame is held by the housing by screwing a first threaded portion of the lens frame with a second threaded portion of the housing while the first elastic body is attached to the lens frame, wherein the cover portion is held by the housing such that the second elastic body is sandwiched between the cover portion and the lens by screwing a third threaded portion with a fourth threaded portion of the housing, wherein in an optical axis direction, a first biasing force applied to the lens unit by the first elastic body is in the same direction as a second biasing force applied to the lens unit by the second elastic body, wherein the same direction is a direction from an object toward a sensor unit, wherein a bottom surface of the groove portion is tilted so that a distance from the optical axis decreases as a position approaches the cover portion, wherein the first elastic body is provided on the bottom surface of the groove portion to bias the lens unit with the first biasing force toward the sensor unit in the optical axis direction and to bias the lens unit with a third biasing force toward the optical axis in a direction orthogonal to the optical axis and wherein backlash in the optical axis direction between the first threaded portion of the lens frame and the second threaded portion of the housing is biased toward the sensor unit by the first biasing force in the optical axis direction generated by the first elastic body.

8. The lens module according to claim 7, wherein each of the first elastic body and the second elastic body has an annular shape, and wherein the second elastic body has a diameter smaller than that of the first elastic body.

9. The lens module according to claim 7, wherein the cover portion is a separate member from the housing.

10. The lens module according to claim 9, wherein the cover portion is held by the housing as a result of that the third threaded portion of the cover portion and the fourth threaded portion of the housing being engaged with each other.

11. The lens module according to claim 7, wherein the housing and the lens unit are adhered together.

12. The lens module according to claim 7, wherein the housing has an opening portion, and wherein the lens unit is inserted into the opening portion in the housing and held by and engaged with the housing.

* * * * *